Patented Apr. 25, 1933

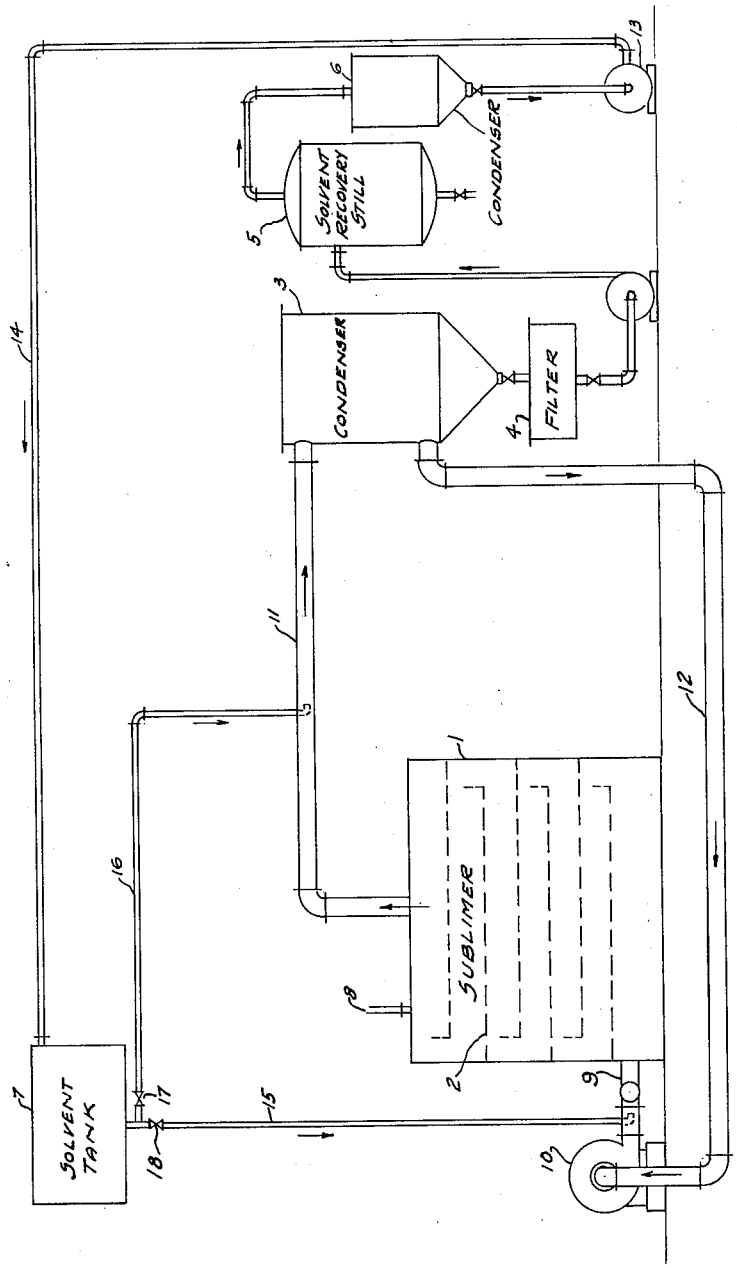

1,905,903

UNITED STATES PATENT OFFICE

ALPHONS O. JAEGER, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF CRUDE AROMATIC COMPOUNDS

Application filed March 22, 1930. Serial No. 438,234.

This invention relates to the purification of crude aromatic compounds and semi-refined aromatic compounds and especially such hydrocarbons as anthracene.

In our co-pending applications Serial No. 397,733 filed October 5, 1929, Serial No. 397,738 filed October 5, 1929 and Serial No. 404,202 filed November 1, 1929, we have described methods of purifying aromatic compounds and particularly aromatic hydrocarbons such as anthracene by a vapor sublimation with vapors of materials which are solvents for one or more of the impurities in the material to be purified and particularly solvents which also form with the material to be purified azeotropic mixtures of relatively high vapor pressure. The method described in the applications above referred to is tremendously effective as a double purification can be effected if desired since the sublimation itself preferentially vaporizes certain constituents and when the vapors are condensed the solvent again purifies by its solvent action. Great as is the advance represented by the processes described in the applications above referred to, they are subject to certain disadvantages and a certain lack of flexibility. In the first place since the vapor of the solvent is the carrying medium for the material to be sublimed, relatively large amounts of solvent vapor are necessary, and as the loss of solvent is one of the main costs in the process this represents a considerable economic disadvantage. With some solvents such as furfural a further disadvantage is to be noted, namely, that the solvent at the high temperatures tends to polymerize and losses are thereby increased which is a serious disadvantage in the use of furfural and somewhat limits its utility although it is the best solvent from the point of view of completeness of purification since it is solvent for both carbazole and phenanthrene as well as deal oils.

The disadvantages of the azeotropic vapor sublimation processes are avoided by the present invention and a major part or all of the advantages retained by using as a part or whole of the gaseous subliming medium an indifferent gas or vapor such as nitrogen, carbon dioxide, hydrogen, illuminating gases, steam, etc. When a non-solvent gas or vapor is used, the amount of solvent vapor required is greatly decreased, and particularly the amount of solvent remaining in the still residue is likewise decreased since the non-solvent gas or vapor lowers the partial pressure on the solvent in the still residue and tends to sublime the last traces of solvent out of it. As the non-solvent gases are for the most part much cheaper than solvent vapors, a notable saving in cost is effected, particularly when they are recirculated, an easy matter requiring the ordinary type of closed circuit condenser and still with a gas lock discharge for the condenser. Not only is the amount of solvent actually used decreased, but in the case of delicate solvents such as furfural the tendency for loss by polymerization is greatly decreased, first, because the temperature can be maintained somewhat lower if desired and, secondly, because the dilution of the furfural tends to reduce polymerization. Especially, if steam or a similar gas or vapor is used, polymerization is very greatly decreased as this opposes condensation and polymerization.

While the present invention effects a notable saving when a mixture of non-solvent vapor and solvent vapor is used, still greater savings in solvent vapor can be obtained at the expense of somewhat less efficient purification by subliming with the non-solvent vapor and introducing solvent vapors into the gas stream after it has left the still. This is very economical of solvent but normally produces somewhat less efficient separation as the separation by preferential vaporization in the still is not obtained.

Such a method, however, can be very easily used with a solvent such as furfural that is relatively easily attacked and fairly expensive, and in the case of the purification of anthracene the use of furfural injected into the vapors despite the loss in efficiency in vaporization nevertheless gives a more desirable product than the straight vapor sublimation with a less efficient solvent. The present invention, therefore gives a very important additional flexibility to the purification of aromatic compounds by vapor sublimation.

Typical non-solvent gases and vapors have been described above, but it should be understood that while of course the invention is limited to the use of vapors of materials which are not solvents for the impurities in the crude aromatic compound, nevertheless it is not absolutely essential to use a non-reactive vapor and in some cases air or combustion gases still containing oxygen may be used where the fire danger is not sufficiently great to render their use undesirable. When air or combustion stack gases are used they are sufficiently cheap so that a recirculation is not necessary, and it should be understood that in its broader aspects the invention is not limited to entirely non-reactive gases and vapors.

The sublimation processes of the present invention may also be combined with other methods of purification; thus, for example, vapors leaving the sublimining still may be passed through a purification catalyst or adsorbent in order to adsorb or modify some of the impurities which it is desired to remove, such as dead oils and other tarry residues carried over by the gases. Such adsorbents may be porous material such as silica gel, other types of activated $SiO_2$, activated carbon, etc. The highly porous aluminum oxide adsorbents such as alumina gel are particularly effective, and less adsorbent natural forms of alumina such as bauxite may also be used. The use of a purification catalyst or adsorbent is not claimed generally here, this forming the subject matter of our co-pending application Serial No. 337,534 filed February 4, 1929, but is only claimed in connection with the sublimation process of the present application in which non-solvent gases or vapors are combined with solvent vapors.

The material to be sublimed may be subjected to pretreatment, which renders some of the impurities relatively non-volatile. Thus, for example, in the case of impure anthracenes containing carbazole they may be pretreated with caustic alkali to form the carbazole salt which is non-volatile or the mixture may be subjected to the action of other materials which form insoluble carbazole compounds; for example, nitrobenzene which forms with carbazole a red dye which is relatively non-volatile or oxalic acid or similar materials forming non-volatile dyes with carbazole may be used. Other reagents are effective in the case of other impurities and this additional treatment may take place before the material is charged into the subliming still or it may take place when the material is in the still.

Preliminary treatment by heat alone or heat in the presence of condensing agents which tend to condense or polymerize some of the condensible materials may also be used, as may a partial refluxing in the subliming still in order to effect a sharper separation or further condensation or polymerizaton of the impurities. These treatments in which one or more impurities are transformed into relatively non-volatile substances either by chemical reaction with a reagent or by polymerization, condensation, and the like, with or without a catalyst are not claimed broadly in the present application but form the subject matter of our co-pending application Serial No. 278,648 filed May 18, 1928.

The present invention is generally applicable in the purification of aromatic compounds and not only can the solvents described in our prior applications above referred to be used, namely, chlorinated compounds such as orthodichlorbenzene, furfural and its homologues and analogues, aromatic and alicyclic hydrocarbons such as solvent naptha, tetraline, phenols, etc., but the present invention makes it possible to utilize any other solvents such as nitrobenzene, pyridines, paraffins, petroleum oil fractions, cyclohexanol, cyclohexanol acetate, aniline and other amines, quinoline bases, acetone oil, and the like and is, therefore, not to be considered as limited to the particular solvents as set out in the applications above referred to.

Where non-solvent gas is used and is recirculated the small amounts of solvent vapors remaining in the gas after the solvent has been condensed in a condenser are simply passed back into the system as the subliming gas is recirculated, and, therefore, in such cases it is ordinarily not necessary to provide for any means of recovering these solvent vapors. Where, however, recirculation is not used as, for example, when a sufficiently cheap source of indifferent or other gases is available, it is ordinarily desirable to separate out the vapors of the solvent still remaining in the subliming gas as it leaves the condenser, and for such purposes any suitable means may be used such as absorbing in an activated carbon or silica gel, scrubbing with a solvent for the vapors, and the like.

The fractional sublimation of the present invention may be effected in a simple batch process or the molten crude aromatic compound may be either sprayed into ascending vapors of the subliming solvent or permitted to flow counter current thereto, for example in a baffle tower. These processes require a more complicated equipment, but present the advantage that the process may be made continuous with respect to the crude product, the still residue being continuously drawn off as fresh material is sprayed or flows down the tower. The advantages of this continuous process are particularly notable with the present invention where an indifferent subliming gas or vapor is used as losses from solvent vapors removed with the still residue are reduced to a minimum.

Suitable equipment for utilizing the invention in a continuous process is illustrated diagrammatically in the accompanying drawing, in which the above described steps are represented by the apparatus capable of accomplishing them. The plant consists of a sublimer 1, provided with suitable baffles 2 or other means for promoting gas and liquid contact, a condenser 3, filter 4, solvent recovery still 5 with condenser 6 and solvent tank 7. The aromatic compound to be purified, which has been liquefied if necessary, enters the sublimer through the pipe 8 and flows in thin films over the baffles 2 counter to a rising stream of non-solvent gases and solvent vapors blown through the pipe 9 by pump 10. In the case of crude anthracene the inert gas may well be $CO_2$ and the solvent vapors may be those of furfural, as described in Example 7. This substance is an excellent solvent for phenanthrene and carbazole but does not dissolve anthracene to any great extent, and consequently the former substances are held back while the latter forms an azeotropic mixture with the furfural and sublimes over at temperatures below its boiling point at the pressure used. The carbon dioxide lowers the partial pressure of the azeotropic mixture and thus permits it to pass over at a lower temperature, in a manner similar to that of the well known "steam distillation", which is itself a sublimation and not a distillation.

The gases and vapors from the sublimer pass through the pipe 11 to the condenser 3, where the vapors are condensed while the permanent gases pass off through the pipe 12 to the pump 10. The undissolved anthracene is filtered off in the filter while the furfural is separated from dissolved material in the solvent recovery still 5 and returned to solvent tank 7 by way of condenser 6, pump 13 and return pipe 14.

The process has been described as if all the solvent used were introduced into the sublimer through pipes 15 and 9, along with the non-solvent gases or vapors. In many cases, however, it is of advantage to introduce further amounts of the solvent, suitably preheated, into the sublimer vapors, as has already been described. For this purpose the pipe 16 suitably controlled by valve 17 is provided, which leads directly from the solvent tank to the outlet pipe 11 of the vaporizer. By proper control of valve 18 in the pipe 15 and of the valve 17 any desired proportion of the solvent may be by-passed around the sublimer, thus avoiding difficulties due to polymerization.

The principles of the invention have been illustrated in connection with the purification of crude anthracene, which is a process in which its advantages are fully realized, but it will be apparent that these principles may be applied to the treatment of any aromatic compound containing impurities which are soluble in a solvent which does not dissolve the compound to be purified.

The invention will be described in greater detail in connection with the following specific examples which are merely representative illustrations and which are in no sense intended to limit the invention to the exact details therein set forth.

In the specification and claims the terms "subliming" and "sublimation" are used in their broad technical sense to define the passage of material into the vapor phase at temperatures below its boiling point at the pressures used, and it is understood that these terms will have no other meaning.

*Example 1*

A crude anthracene of 30% purity is melted in a still, the temperature being maintained between 260 and 320° C. A mixture of carbon dioxide and vapors of orthodichlorbenzene, for example in the proportion of from 2:1 to 5:1 which vapor mixture may if desired be superheated to the temperature of the molten anthracene, are passed through it, causing vaporization of the anthracene and the major part of the carbazol, but only of small amounts of phenanthrene and the vapors led to a condenser, if desired being first passed through a purification catalyst or adsorbent, such as alumina gel, activated silica or activated carbon or mixtures, the condensate cooled to room temperatures and filtered. The carbon dioxide, containing small amounts of orthodichlorbenzene vapors, is then recirculated, for example by superheating and passing through liquid orthodichlorbenzene. The filter cake contains between 60 and 65% anthracene and the filtrate can be distilled from the remaining cake which contains 23% anthracene, returned to the still, and used for the next batch. The total recovery of the anthracene is about 96%.

Semi-refined anthracene of a higher grade of purity, for example from 36 to 50% may be used and a more highly purified final product is obtained with even better recoveries.

*Example 2*

Crude anthracene as described in Example 1 is treated with a mixture of nitrogen and the chlorinated residue from the chlorine purification of light oil as described in the patent of Alphons O. Jaeger No. 1,741,305 dated December 31, 1929. The conditions are the same as in Example 1, and the anthracene obtained is of about the same composition, varying slightly with the nature of the chlorinated residue.

*Example 3*

Crude anthracene of 29% purity is melted and heated up to 280–320° C. It is permitted to flow through the baffle tower in countercurrent to a mixture of vapors of solvent naphtha and carbon dioxide in the proportion of from 1:1 to 1:3. The vapors are preferably at about the temperature of the anthracene. The exhaust still residue consisting of a major portion of phenanthrene together with unvaporized anthracene and carbazol and small amounts of pyrene, retene, dead oils, etc, is continuously removed from the bottom of the still and the vapors are condensed at room temperatures, the condensate removed and filtered. The carbon dioxide is recirculated as described in Example 1. The cake from the filtration contains from 60–65% anthracene, recovery being better than 60%. About 26% of the impurity is carbazole, the remainder being mostly phenanthrene. The filtrate is distilled and the remaining cake contains 23% anthracene, the recovery being about 30% so that the total anthracene recovered is more than 90%. The cake contains almost as much anthracene as the original crude and is added to a fresh batch of crude and the cycle repeated.

Semi-refined anthracene of a higher grade of purity, for example from 36 to 50% may be used and a more highly purified final product is obtained with even better recoveries.

*Example 4*

A crude anthracene as described in Example 3 is sublimed with a mixture of nitrogen and cresylic acid vapors. The filter cake from the condenser contains about 75% anthracene and represents about 80% of the anthracene originally present. The filtrate is then either partly distilled and a second cake taken or entirely distilled. The material obtained is about 50% anthracene which can be recirculated if necessary or purified by other means.

Instead of cresylic acid vapors, vapors of aniline may be used, the yields and recoveries being about the same, but the still residue contains a large amount of carbazole.

*Example 5*

The residue from solvent purification of anthracene containing about 35% carbazole and the rest mainly phenanthrene is sublimed as described in the foregoing examples using either solvent naphtha or orthodichlorbenzene vapors admixed with carbon dioxide. A product is obtained containing 55–60% carbazole, from which purified carbazole can readily be obtained by the usual methods, for example by alkali fusion.

*Example 6*

Crude anthracene as described in Example 3 is subjected to sublimation with a mixture of air and kerosene vapors. The product is not quite as high in anthracene content as when solvent naphtha is used, but it is not necessary to recirculate the air and a cheaper equipment is therefore made possible.

If desired, high boiling esters may be used instead of kerosene vapors.

*Example 7*

Crude anthracene of 29% purity is melted and heated to 280° C. and passed through a tower in countercurrent to a mixture of furfural vapors and carbon dioxide or illuminating gas mixtures in the proportion of about 1:5. The furfural, being a solvent for both phenanthrene and carbazol, causes vaporization of a major portion of the anthracene together with minor portions of the latter substances. The vapors are condensed as described in Example 3 and the condensate filtered, a cake being obtained which contains about 88% anthracene, 4% carbazole and the remainder phenanthrene. The recovery is about 76% of the original anthracene in the crude. The filtrate is distilled and the residue contains about 14% anthracene, the recovery being about 23.8% and the total recovery therefore being about 99.8% of the anthracene. The losses of furfural by the polymerization are very much lower than when furfural vapor is used as the only subliming medium. Similar results are obtained with methyl furfural, and instead of using carbon dioxide steam may be used which results in a still lower loss by polymerization of furfural but slightly decreases the purity of the product obtained without however effecting the percentage recovery of anthracene.

If 36–40% anthracene is used in the process of the above example a product of 90–92% is obtained with even higher recoveries. A still purer product can be obtained if the crude or semi-purified anthracene is subjected to a preliminary treatment with caustic alkali or with nitrobenzene in order to render part or all of the carbazole non-volatile. Where nitrobenzene is used a small amount of the red dye formed with the carbazole is sublimed over but as this dye is readily soluble in the solvent it is removed with it in the filtration of the condensate. Similar results are obtained if pyridine or quinoline bases are used instead of furfural.

Example 8

Crude anthracene containing about 29% anthracene is sublimed at about 300° C. with a stream of carbon dioxide or hydrogen passed through an alumina gel adsorbent and furfural vapors are added to the gas stream and condensed. This may, for example, be effected by spraying liquid furfural into the hot vapors. The condensate is removed and carbon dioxide recirculated as described above. An anthracene of about 80% purity or higher is obtained and the filter residue obtained contains sufficient anthracene to warrant its reworking with a fresh batch of crude. The total recovery of anthracene is somewhat lower but the amount of furfural used is very much less and the losses by polymerization are practically non-existent.

If desired part of the furfural may be present in the original subliming vapors, for example in the proportion of about 1 of furfural to from 10 to 20 of carbon dioxide or hydrogen. When this modification is used it is not necessary to be careful in removing any traces of furfural vapors from carbon dioxide or hydrogen before the latter are recirculated.

In the foregoing examples the use of non-solvent gases with single solvents has been described and usually this is the preferred method, but mixtures of solvent vapors may also be used and one solvent vapor may be used in conjunction with the non-solvent gases during the sublimation and another solvent added to the hot vapors. Thus, for example, a vapor sublimation can be effected with a light hydrocarbon such as benzol, and furfural or tetraline may be added to the vapors in order to obtain greater purification. Other combinations of solvents will be apparent and are, of course, included in the invention.

The expression "non-solvent gas" as used in the claims is intended to include all gases and vapors which do not have at ordinary temperatures any marked tendency to dissolve any of the constituents of the crude or semi-purified aromatic compound to be purified.

What is claimed as new is:

1. A method of purifying solid impure aromatic hydrocarbons from the distillation of coal tar which comprises subjecting them in liquid condition to sublimation by contact with a subliming medium containing at least one gaseous medium which at ordinary temperatures is not a solvent for the hydrocarbon to be purified and condensing the vapor stream in the presence of at least one solvent for at least one impurity, which solvent is present in the vapor stream prior to condensation.

2. A method according to claim 1 in which at least part of the solvent vapor is present with the gaseous medium when the latter contacts with the impure aromatic hydrocarbon to be sublimed.

3. A method according to claim 1 in which all of the solvent vapor is associated with the gaseous medium at the time the latter contacts with the impure aromatic hydrocarbon to be sublimed.

4. A method according to claim 1 in which the vapors before condensation are subjected to the action of a purification adsorbent.

5. A method according to claim 1 in which the vapors before condensation are subjected to the action of alumina gel.

6. A method according to claim 1 in which the aromatic hydrocarbon to be purified has been subjected to treatment capable of transforming at least one impurity into a relatively non-volatile form.

7. A method of purifying impure anthracene, which comprises subjecting it in liquid condition to sublimation by contact with a subliming medium containing at least one gaseous medium which at room temperatures is not a solvent for anthracene and condensing the vapor stream in the presence of at least one solvent for phenanthrene or carbazole or both, which solvent is present in the vapor stream prior to condensation.

8. A method according to claim 7 in which at least part of the solvent vapor is present with the gaseous medium when the latter contacts with the impure aromatic hydrocarbon to be sublimed.

9. A method according to claim 7 in which all of the solvent vapor is associated with the gaseous medium at the time the latter contacts with the impure aromatic hydrocarbon to be sublimed.

10. A method according to claim 7 in which the vapors before condensation are subjected to the action of a purification adsorbent.

11. A method according to claim 7 in which the vapors before condensation are subjected to the action of alumina gel.

12. A method according to claim 7 in which the impure anthracene is subjected to the action of at least one reagent capable of transforming at least part of the carbazole into a relatively non-volatile product.

13. A method according to claim 7, in which the solvent vapor is a solvent for both carbazole and phenanthrene.

14. A method according to claim 7, in which the solvent contains a furfural.

15. A method according to claim 1, in which the gaseous medium is substantially inert.

16. A method according to claim 7, in which the gaseous medium is substantially inert.

17. A method according to claim 1, in which the gaseous medium is a non-oxidizing medium.

18. A method according to claim 7, in which the gaseous medium is a non-oxidizing medium.

Signed at Pittsburgh, Pennsylvania, this 19th day of March, 1930.

ALPHONS O. JAEGER.
LLOYD C. DANIELS.